(12) United States Patent
Ryan et al.

(10) Patent No.: US 7,847,677 B2
(45) Date of Patent: Dec. 7, 2010

(54) METHOD AND SYSTEM FOR PROVIDING AUDITORY FEEDBACK FOR THE VISUALLY IMPAIRED WHEN DEFINING VISUAL MODELS

(75) Inventors: Corinne M. Ryan, Westford, MA (US); Kimberly A. Frederick, Somerville, MA (US)

(73) Assignee: International Business Machines Corporation, Armonk, NY (US)

( * ) Notice: Subject to any disclaimer, the term of this patent is extended or adjusted under 35 U.S.C. 154(b) by 545 days.

(21) Appl. No.: 11/867,183

(22) Filed: Oct. 4, 2007

(65) Prior Publication Data
US 2009/0091430 A1 Apr. 9, 2009

(51) Int. Cl.
*G08B 3/10* (2006.01)

(52) U.S. Cl. .......... 340/384.5; 340/384.1; 715/716; 715/727; 715/729

(58) Field of Classification Search .......... 340/384.1, 340/384.5, 384.7; 715/700, 716, 727, 729
See application file for complete search history.

(56) References Cited

U.S. PATENT DOCUMENTS

| | | | |
|---|---|---|---|
| 5,186,629 A | 2/1993 | Rohen | |
| 5,223,828 A * | 6/1993 | McKiel, Jr. | 340/825.19 |
| 5,786,818 A * | 7/1998 | Brewer et al. | 715/822 |
| 5,991,781 A | 11/1999 | Nielsen | |
| 6,140,913 A | 10/2000 | Okada et al. | |
| 6,243,092 B1 * | 6/2001 | Okita et al. | 715/866 |
| 6,728,675 B1 * | 4/2004 | Maddalozzo et al. | 704/258 |
| 6,834,373 B2 | 12/2004 | Dieberger | |
| 6,934,907 B2 | 8/2005 | Brunet et al. | |
| 6,999,066 B2 | 2/2006 | Litwiller | |
| 7,106,220 B2 | 9/2006 | Gourgey et al. | |
| 7,176,898 B2 | 2/2007 | Litwiller | |
| 7,181,692 B2 | 2/2007 | Siegel | |
| 7,228,495 B2 | 6/2007 | Adapathya et al. | |
| 7,568,158 B2 * | 7/2009 | Ulrich et al. | 715/727 |
| 2003/0142149 A1 * | 7/2003 | Brown et al. | 345/978 |
| 2004/0123244 A1 | 6/2004 | Campbell et al. | |
| 2006/0013444 A1 | 1/2006 | Kurzweil et al. | |
| 2008/0229206 A1 * | 9/2008 | Seymour et al. | 715/727 |

OTHER PUBLICATIONS

Fredrik Winberg, Auditory Direct Manipulation for Blind Computer Users Report on Work in Progress, IEEE 2001, pp. 56-59.
Elizabeth Mynatt et al., The Mercator Environment: A Nonvisual Interface to X Windows and Unix Workstations, Multimedia Computing Group, George Institute of Technology, Atlanta, Georgia, pp. 1-9.

* cited by examiner

*Primary Examiner*—Toan N Pham
*Assistant Examiner*—Kerri McNally
(74) *Attorney, Agent, or Firm*—David A. Dagg

(57) ABSTRACT

A system for providing auditory feedback to visually impaired users when defining visual models. As the visually impaired user creates a visual model, the system detects when an object is placed in such a way that it overlaps with at least one previously placed object. In response to detection of an overlap, the system causes an auditory warning signal to be produced, indicating to the visually impaired user that object is overlapping a previously placed object. The disclosed system operates to create an invisible object within the user interface to cause a warning to be output, or modifies the object whose placement caused the object overlap to include the overlap warning. The user interface focus is then changed or reset to be on the invisible object or the object that caused the overlap to occur, enabling the user to conveniently fix the overlap condition.

16 Claims, 4 Drawing Sheets

METHOD AND SYSTEM FOR PROVIDING AUDITORY FEEDBACK FOR THE VISUALLY IMPAIRED WHEN DEFINING VISUAL MODELS

FIELD OF THE INVENTION

The disclosed system relates generally to user interfaces for visually impaired users, and more specifically to a method and system for providing auditory feedback for visually impaired users when defining visual models.

BACKGROUND OF THE INVENTION

As it is generally known, in the area of computer hardware and software systems, the term "visual modeling" generally refers to systems for the graphic representation of display objects using graphical programming languages. Existing visual modeling systems employ languages including General-Purpose Modeling (GPM) languages (e.g., UML), as well as Domain-Specific Modeling (DSM) languages (e.g., SysML).

The use of visual modeling systems currently presents an enormous challenge to visually impaired (e.g. blind) users for many reasons. To a small extent, some existing visual modeling tools are implemented so that a screen reader can audibly describe the model to the user as they navigate via keyboard strokes though the model (visually impaired users typically must use a keyboard for user interface navigation instead of a mouse, since knowing where to click using a mouse is generally not possible for them). However, existing systems have still fallen significantly short in meeting the needs of visually impaired users, as further explained below.

Visually impaired users encounter visual modeling in many areas. For example, when working in the field of software development, visually impaired users encounter visual modeling through UML (Uniform Modeling Language) diagrams, modeling tools like the SOA Modeler from IBM Rational Software®, and even when using presentation tools such as the PowerPoint presentation program from Microsoft Corporation. Existing systems enable the visually impaired user to hear screen reader output describing a visual model designed by another user. However, when it comes to enabling a visually impaired user to define a visual diagram, existing systems exhibit many problems. Specifically, a visually impaired user (e.g. system architect or the like) should, for example, be able to define a UML diagram for their team. The visually impaired user can do so with existing systems to a point at which the output of a screen reader program indicates that the diagram is complete and correct. However, when such a "correct" diagram created by the visually impaired user is displayed for sighted users, it may in fact include objects placed or sized so that they obscure or hide data that is intended to be seen. Specifically, the visually impaired user may inadvertently create the diagram with objects (e.g. boxes) that are overlapping, potentially to the point where the diagram is illegible from a printed or visual standpoint, even though it sounded correct to the visually impaired user when read out through a screen reader program.

It would accordingly be desirable to have a new system for supporting a visually impaired user in creating a visual model that is legible for a sighted user in that the objects that are part of the model are not inadvertently overlapping.

SUMMARY OF THE INVENTION

To address the above described and other shortcomings of previous systems, a new method and system are disclosed for providing auditory feedback to visually impaired users when defining visual models. As the visually impaired user creates a visual model, the disclosed system detects when an object is placed in such a way that it overlaps with at least one previously placed object. In response to detection of an overlap, the disclosed system causes an auditory warning signal to be produced, indicating to the visually impaired user that object is overlapping a previously placed object.

In one embodiment, the disclosed system operates to create an invisible object within the user interface to cause the auditory warning to be output. The invisible object is placed in front of the object whose placement caused the overlap, e.g. logically in front of the object whose placement caused the overlap in the tab ordering of objects within the model. In one embodiment, the invisible object includes a warning (e.g. text message, sound such as a beep, etc.) accessible to a screen reader, and the current user interface focus is changed to the invisible object, so that a screen reader program or the like will audibly output the warning from the invisible object. After the warning message is output based on the invisible object contents, the disclosed system may further be embodied to again change the current user interface focus to be on the object whose placement caused the overlap to occur. This enables the user to conveniently fix the overlap condition. Alternatively, the user interface focus may be left on the invisible object, and the user can then change (e.g. tab forward) within the logical object order to get to the overlapping object.

In another embodiment, the disclosed system operates in response to detection of an object overlap by modifying the object whose placement caused the object overlap to include the overlap warning (e.g. text message, sound such as a beep, etc.). The user interface focus is then changed or reset to be on the object that caused the overlap to occur, so that a screen reader program or the like will audibly output the warning from the object that caused the overlap to occur, and enabling the user to conveniently fix the overlap condition.

After the warning message has been initially output, it will again be output each time the user changes the user interface focus to the overlapping object (e.g. by tabbing through the objects in the model back to the invisible model containing the warning or to the overlapping object containing the warning). This enables the user to find the overlap even after they have moved the focus away from the object that caused the overlap to occur.

The disclosed system further operates to detect when the user has fixed the overlap condition, for example by moving or deleting one or more of the overlapping object such that they no longer overlap. In response to detecting that the overlap condition has been fixed, the disclosed system operates to clean up the warning it created, either by deleting the invisible object that it created previously, or by removing the warning that it previously added to the object whose placement caused the overlap to occur. The disclosed system may further be embodied to allow a user to expressly accept the overlap condition, e.g. by clicking on a graphical button or the like, preventing the invisible object from being created or overlapping object modified to include the warning, or similarly causing the previously created invisible object to be deleted or removing the previously added warning from the object whose placement caused the overlap to occur.

In another embodiment, the disclosed system causes the warning it creates to indicate the extent of the overlap detected. In such an embodiment, the warning text or sound may vary with the amount (e.g. absolute length) of overlap between the objects, the percentage of the background object that is obscured by the overlap, etc. For example, in the case of a warning made up of an audible beep or the like, the volume of the sound indicating the overlap may increase as the extent of the overlap increases.

A new system is thus disclosed that supports a visually impaired user in creating a visual model that is legible for a sighted user in that the objects that are part of the model are not inadvertently overlapping.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
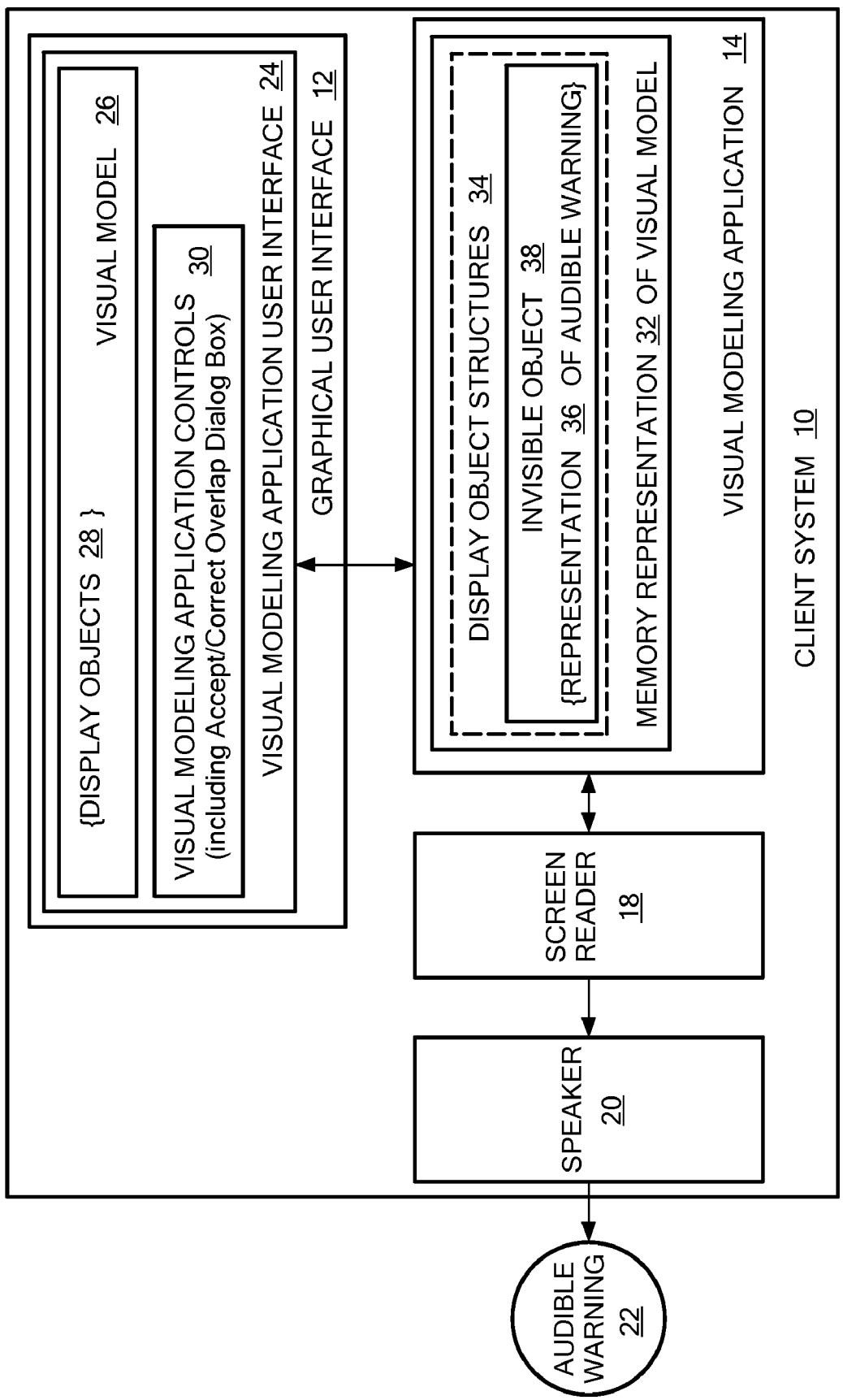
FIG. 1 is a block diagram showing software and/or hardware components in an illustrative embodiment.

FIG. 1 is a block diagram showing software and/or hardware components in an illustrative embodiment of a server system in the disclosed system. As shown in FIG. 1, a client system 10 includes a Graphical User Interface 12, having within it a Visual Modeling Application User Interface 24 generated by a Visual Modeling Application 14. The Visual Modeling Application 14 is shown communicably coupled to a Screen Reader 18, e.g. through an Application Specific Programming Interface (API) or the like, and the Screen Reader 18 is further shown to be operable to cause a Speaker 20 to output an Audible Warning 22. The Visual Modeling Application User Interface 24 is shown including a Visual Model 26 made up of a number of Display Objects 28, and Visual Modeling Application Controls 30, e.g. including an Accept/Correct Overlap Dialog box or the like. The Visual Modeling Application 14 is shown including a Memory Representation 32 of the Visual Model 26, which includes Display Object Structures 34 representing the Display Objects 28. An Representation 36 of Audible Warning 22 is stored in the Display Object Structures 34 by the disclosed system in response to detection of an overlap between two or more of the Display Objects 28. In one embodiment, as shown in FIG. 1, the Representation 36 is contained within an Invisible Object 38 created by the disclosed system in response to detection of the overlap. Alternatively, the disclosed system may operate to store the Representation 36 of the Audible Warning 22 in one of the Display Objects 28 that is determined to be overlapping with one or more other of the Display Objects 28. The Representation 36 of the Audible Warning 22 may, for example, include text that is available to the Screen Reader 18, and which the Screen Reader 18 is operable to convert to the Audible Warning 22 output through the Speaker 20.

The Screen Reader 18 may be any conventional type of screen reading application. For example, Screen Reader 18 may be a software application that interprets the contents of the Graphical User Interface 12 for a visually impaired user through text-to-speech technology, etc. The Screen Reader 18 may, for example, be part of the operating system for Client System 10 (e.g. Narrator, VoiceOver, etc.), or a separate application such as JAWS from Freedom Scientific, Window-Eyes from GW Micro, or Hal from Dolphin Computer Access.

The Client System 10 of FIG. 1 may be any specific type of a computer system or intelligent electronic device, such as a desktop, laptop, or palmtop computer system, or a personal digital assistant, cell phone, or other electronic device. The Client System 10 of FIG. 1 may include or control a display device capable of displaying a graphical user interface (e.g. the Graphical User Interface 12) to a local user (e.g. a visually impaired user), such as a liquid crystal display (LCD), cathode ray tube (CRT), interferometric modulator display (IMOD), light emitting diode (LED), or the like.

Those skilled in the art will recognize that the Visual Modeling Application 14 and/or Screen Reader 18 may be embodied using software or firmware, such as computer application program code, operating system program code, middleware, and/or wholly or partly using digital hardware components, such as application specific integrated circuits (ASICs), field-programmable gate arrays (FPGAs), and the like, and/or combinations of hardware and/or software or firmware. Those skilled in the art will further recognize that the Client System 10 may include one or more processors, and program storage, such as memory, for storing program code executable on such processors, as well as input/output devices and/or interfaces.

Those skilled in the art will further recognize that while the illustrative embodiment of FIG. 1 shows the Visual Modeling Application 14 operating within the Client System 10, a server-based embodiment is also possible, in which the Visual Modeling Application 14 is executed in whole or part on a remote server system communicably connected to the Client System 10 via a communication network, e.g. the Internet, a Local Area Network, etc.

Figure 2:
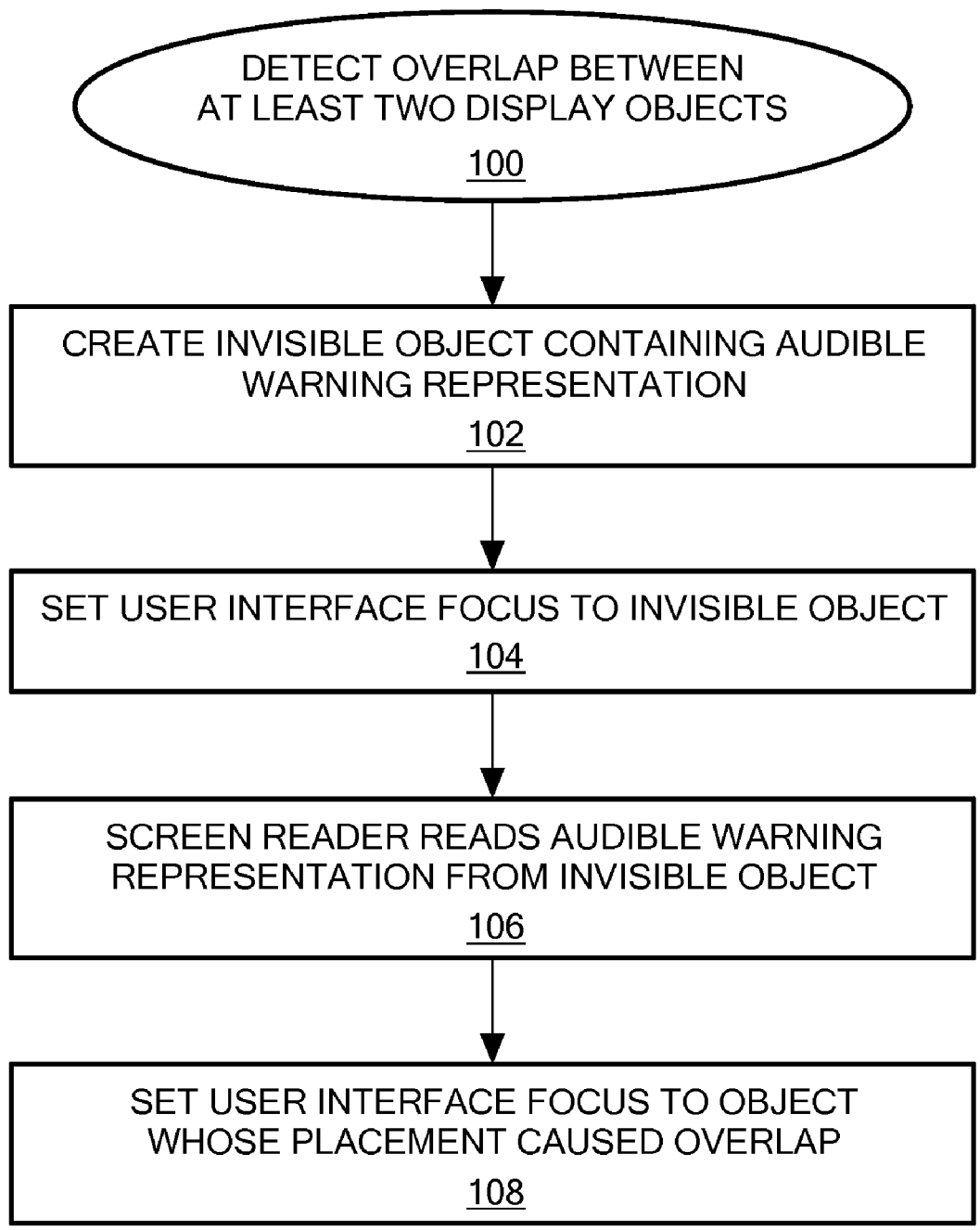
FIG. 2 is a flow chart illustrating steps performed in a first illustrative embodiment to provide audible indication of an overlap between two visual objects in a visual model.

FIG. 2 is a flow chart illustrating steps performed in a first illustrative embodiment to provide audible indication of an overlap between two visual objects in a visual model. At step 100, the disclosed system detects an overlap between at least two display objects in a visual model being created or modified by a user. For example, an overlap may be detected when the user drags an object they have previously created over another existing object, such that one of the two objects is now at least partially visually obscured. Similarly, an overlap may be detected when a user creates a new object such that the new object at least partially obscures another object in the visual model.

In order to support detection of object overlap in the visual model at step 100, in an embodiment of the disclosed system applicable to a Web application, the top left pixel location of each object image can be determined when relative location or specific locations are defined via CSS, JavaScript, etc. Relevant data that is also retrievable on an object image basis is the object width and height. Thus the actual user interface area covered by a box shaped display object is easily calculated. While the necessary calculations become more complex for display object shapes other than quadrilaterals with right angles, calculating the user interface "footprint" for each display object is still possible based on the shape's angles and radii. In an Eclipse application environment, such information may be derived using the java.lang.Object.Rectangle(int x, int y, int width, int height) function, and it is further possible to derive the data defining where each object is located. In each case, by determining the location of multiple object spaces on the screen, the disclosed system can conveniently detect an overlap condition.

At step 102, responsive to the detection at step 100, the disclosed system creates an invisible object containing a representation (e.g. text) of an audible warning to be output to the user. The invisible object may be created at step 100 by adding an image object made up of "transparent" or "clear" pixels (picture elements) into the display object structures of the memory representation of the visual model maintained by the visual modeling application. In one embodiment, applicable in a Windows® application embodiment of the disclosed system or the like, e.g. in the Eclipse open-source software framework, the disclosed system stores the warning representation in the invisible image object stored in the memory representation of the visual model by adding properties (e.g. Microsoft Active Accessibility—"MSAA" properties), such that the value of the invisible object is the text of the warning, so that only a screen reader would ever detect the invisible object and as a result cause the warning to be audibly output to the user. A similar approach can be used in an alternative embodiment applicable in a World Wide Web ("Web") application framework, albeit by providing the warning text in the "ALT" text of the invisible object that is available to the screen reader.

The invisible image created at step 102 is added to the visual model such that it logically falls in front of the image whose positioning caused the overlap to be detected at step 100, e.g. in front of the overlapping object in the tab order of the objects within the visual model. As it is generally known, the tab order of the objects in a user interface determines the sequence in which the focus will change when the user strikes the tab key. Inserting the invisible object in front of the object whose placement caused the overlap to occur enables the disclosed system to conveniently make the transition the focus from the invisible object to the object whose placement caused the overlap condition at step 108. In an alternative embodiment applicable to a Web application framework, the invisible image links to the object image whose placement caused the overlap condition via its HTML "anchor" element.

After the invisible image is added at step 102 in response to the overlap detection at step 100, the disclosed system operates at step 104 to set the user interface focus to the invisible image, in order to cause the screen reader to output the warning text as an audible warning to the user at step 106. As it is generally known, the current focus in a graphical user interface indicates the component in the graphical user interface that is currently selected. User actions (e.g. commands regarding object position, format or scaling, etc.) are applied to the component in the graphical user interface that currently has the focus. The screen reader will read out any text made available to it within an object that has been given the current focus.

At step 108 the disclosed system sets the user interface focus to the display object whose placement caused the overlap condition to be detected at step 100.

Figure 3:
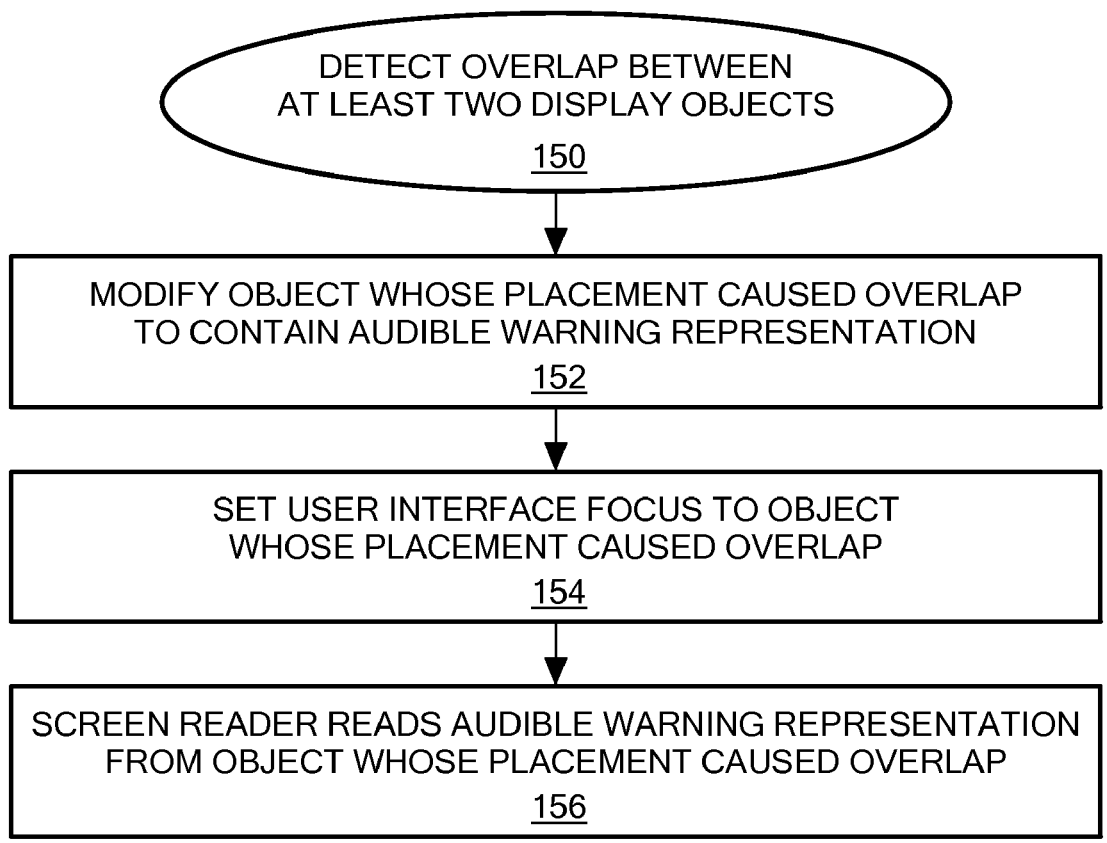
FIG. 3 is a flow chart illustrating steps performed in a second illustrative embodiment to provide audible indication of an overlap between two visual objects in a visual model.

FIG. 3 is a flow chart illustrating steps performed in a second illustrative embodiment to provide audible indication of an overlap between two visual objects in a visual model. Instead of creating an invisible object, as in the embodiment of FIG. 2, the embodiment of FIG. 3 modifies the memory representation of the display object whose placement caused the overlap to be detected so that the audible warning is output.

At step 150, the disclosed system detects an overlap between at least two display objects in a visual model being created or modified by a user, as described above for step 100 of FIG. 2. At step 152, responsive to the detection at step 150, the disclosed system modifies the memory representation of the display object whose placement caused the overlap condition to be detected at step 150 to contain a representation (e.g. text) of an audible warning to be output to the user. In an embodiment applicable to a Windows® application embodiment of the disclosed system or the like, e.g. in an Eclipse open-source software framework, the disclosed system stores the warning representation in the object causing the overlap condition in the memory representation of the visual model by adding properties (e.g. Microsoft Active Accessibility— "MSAA" properties) such that the value of the object is the text of the warning, so that a screen reader would audible output the warning to the user. A similar approach can be used in an alternative embodiment applicable in a World Wide Web ("Web") application framework, albeit by providing the warning text in the "ALT" text of the object that is available to the screen reader.

After the object that caused the overlap to be detected is modified at step 152 to contain the warning message, at step 154 the disclosed system operates to set the current user interface focus to the object that caused the overlap to be detected, in order to cause the screen reader to output the warning text as an audible warning to the user at step 156.

Figure 4:
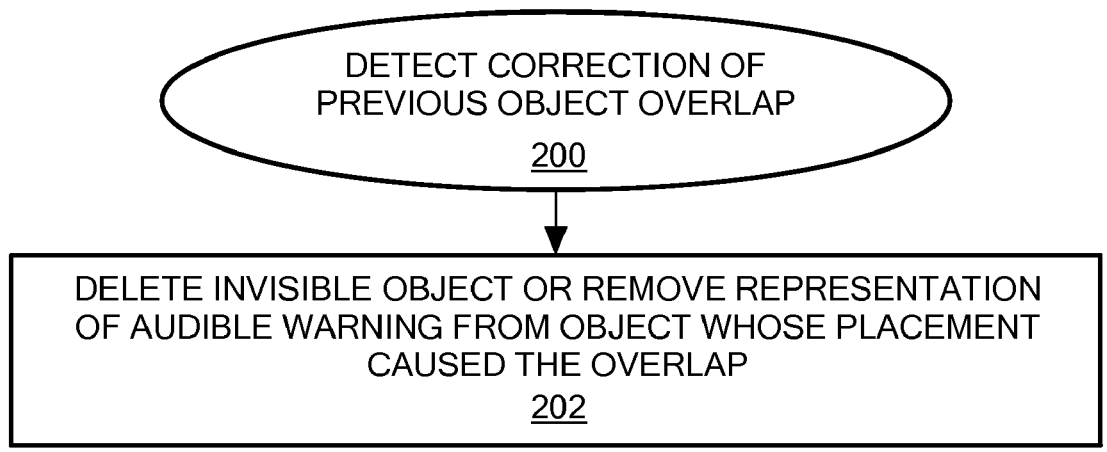
FIG. 4 is a flow chart illustrating steps performed by the disclosed system to respond to a user causing two previously overlapping display objects to no longer overlap.

FIG. 4 is a flow chart illustrating steps performed by the disclosed system to respond to a user causing two previously overlapping display objects to no longer overlap. At step 200, the disclosed system detects a correction of a previously detected object overlap in the visual model. Such a correction may, for example, be detected when two or more objects detected to be overlapping have been re-positioned by the user within the visual model so that no overlap is present. Similarly, an overlap correction may be detected at step 200 when one of two overlapping display objects is deleted by the user. In response to the detection at step 200, the disclosed system operates at step 202 to clean up after itself with regard to actions performed to cause the audible warning to be produced. In an embodiment in which an invisible object was previously created in order to cause the overlap warning to be output, the invisible object is deleted at step 202. In an embodiment in which the object whose placement caused the overlap to be detected was modified to contain the warning text, at step 202 the disclosed system deletes the warning text from that object. The actions performed at step 202 prevent the overlap warning from being output after the overlap condition has been corrected.

Figure 5:
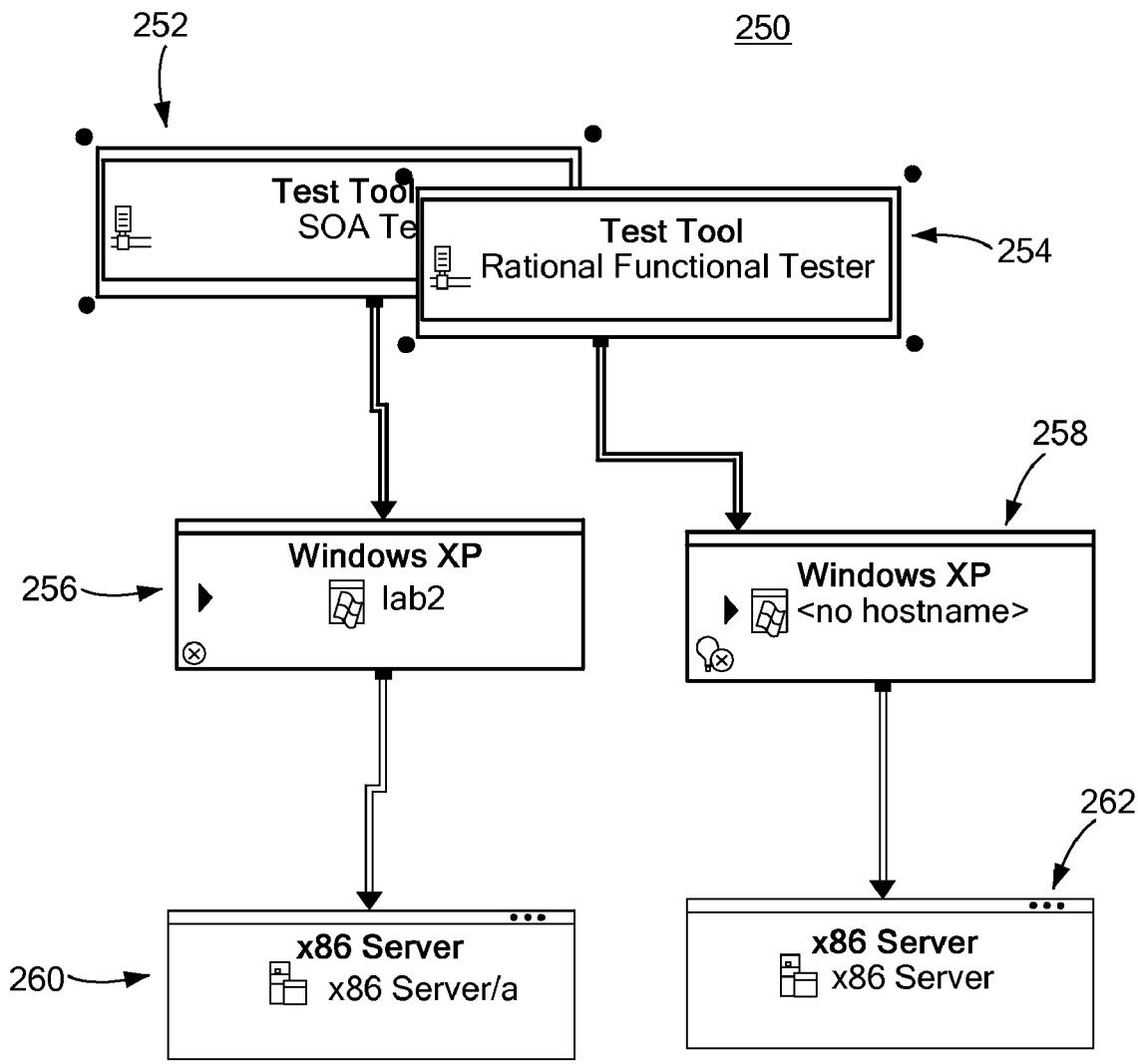
FIG. 5 is a simplified screen shot showing a visual model including two display objects determined to overlap by the disclosed system.

FIG. 5 is a simplified screen shot showing a visual model 250 including two display objects 252 and 254 determined to overlap by the disclosed system. The visual model of FIG. 5 further includes display objects 256, 258, 260 and 262. A use case is now described using the visual model 250 of FIG. 5 to explain how the disclosed system would operate, in contrast with the operation of previous systems.

In the case of a visually impaired (e.g. blind) user that is a software development team leader, the user would create the visual model 250 using a visual modeling tool (e.g. IBM® Rational® Tester for SOA Quality), including display objects 252, 254, 256, 258, 260 and 262 (e.g. boxes) displayed in the user interface, and relevant to parts of a test environment for her team to do deployments for testing. The user is able to use menus to add objects to the visual model board and is able to use menus (e.g. within visual modeling application controls 30 of FIG. 1) to add each new object (each newly added object is given the user interface focus), and can resolve dependencies or decide which other existing object in the visual model to connect a new object to. However, as illustrated in FIG. 5, overlap of display objects 252 and 254 may occur. Even using a system that attempts to prevent overlap of newly created objects with previously existing objects, such an overlap may result from movement of the objects within the visual model. Using previous systems, the user would be able to keyboard navigate from one object in the diagram to the next, hear the details and the connections between the objects as output by a screen reader, and navigate via the object connections as well. In previous systems, the screen reader would correctly read out the contents of all objects in the visual model without reporting the overlap between object 252 and object 254. However, when the user sent the model 250 to a sighted user on her team, who exams the model 250 visually without using a screen reader, the sighted user would not be able to visually determine if the partially obscured display object 252 is the SOA Tester or the SOA Tester Agent because of the overlap between object 254 and object 252.

Specifically, when the visually impaired team leader navigates (e.g. by hitting the tab key or a hot key move the focus from object to object) through the visual model 250, in a previous system the screen reader would output the following spoken text:

(1) "Test Tool. SOA Tester" (for display object 252)
(2) "Windows XP. lab 2" (for display object 256)
(3) "x86 Server. x86 Server/a" (for display object 260)

Here the output of the screen reader may provide some indication that there are no further connections to other display objects from display object 260, and the visually impaired user may as a result use a predetermined command (e.g. menu command or hot key) to navigate to the next "root" object—i.e. display object 254.

(4) "Test Tool. Rational Functional Tester" (for display object 254)
(5) "Windows XP. no hostname" (for display object 258)
(6) "x86 Server. x86 Server" (for display object 262)

Thus using previous systems, the screen reader output would not have provided any indication to the visually impaired user that an overlap between display objects 252 and 254 was present. However, using an embodiment of the disclosed system to create the visual model 250, the visually impaired user would be notified of the overlap when the overlap occurred, and each time the visually impaired user traversed the display object whose placement caused the overlap. For example, in the case where the placement or creation of object 252 by the user caused the overlap between objects 252 and 254, then the following text is an example of what would be audibly output by the screen reader at the time the overlap was created: "Test Tool. SOA Tester. Warning! Overlapped by Test Tool. Rational Functional Tester.", where the "Warning! Overlapped by Test Tool. Rational Functional Tester." is the audible warning of the overlap. Thus, in this example, the text "Warning! Overlapped by Test Tool. Rational Functional Tester." would be the text included in the invisible object created by the disclosed system or added to the object 252 memory representation, depending on the specific embodiment. After output of the audible warning, the current user interface focus would be set to the object 252 so that the user could correct the overlap condition, for example by moving object 252 such that it is no longer obscured by object 254.

While the above description is with regard to a system in which the steps described with reference to FIGS. 2-5 may be performed by the Visual Modeling Application 14 of FIG. 1, the disclosed system is not limited to such an implementation. Accordingly, the disclosed system may be implemented in various other specific ways, e.g. as a plug-in or the like that can added to an extensible application platform, as a separate tool from the visually modeling application that runs on the visually impaired user's desktop or the like, etc.

In addition, while the above description sets forth that the audible warning is provided upon initial detection of the object overlap, the audible warning will be played again each subsequent time the user causes the object whose placement caused the overlap to receive the focus of the user interface, while the overlap has not been fixed. This enables the user to navigate away from the overlapping objects, and then subsequently relocate the overlap.

Further, while for purposes of explanation the above description sets forth a specific audible warning, the disclosed system may be embodied such that any specific warning is output. The audible warning may be text read by a screen reader, or a beep or other sound selected by the user. Moreover, the disclosed system may be embodied so that the warning provided includes an indication of the extent of the overlap detected. An embodiment supporting this feature may, for example, output a relatively louder beep or other audible warning sound for a relatively more extensive object overlap. Accordingly, a small overlap might produce a relatively softer warning (e.g. beep or other sound), while an overlap in which half of an obscured object could not be seen would produce a relatively louder warning (e.g. beep or other sound). The warning provided by an embodiment of the disclosed system may further indicate the extent of overlap between objects by other means, e.g. through the contents of the text added to a invisible object or to an object whose placement caused the overlap to occur. For example, a text warning might indicate that a display object has been completely obscured (e.g. "Warning! Object X has been completely obscured by Object Y!"), or that a display object is only partially obscured (e.g. "Warning! Object X has been partially obscured by Object Y!"). Similarly, the specific warning output by an embodiment of the disclosed system might audibly indicate the percentage of an object that is obscured by the overlap condition (e.g. "Warning! Object X is 50 percent obscured by Object Y!"), or the amount of area of an object that is obscured by the overlap condition (e.g. "Warning! Three square inches of Object X is obscured by Object Y!"). Other specific type of warnings and warning content are further possible in various embodiments as may be appropriate.

The disclosed system can take the form of an entirely software embodiment, an entirely hardware embodiment, or an embodiment containing both software and hardware elements. The figures include block diagram and flowchart illustrations of methods, apparatus(s) and computer program products according to an embodiment of the invention. It will be understood that each block in such figures, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using wireless, baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed.

We claim:

1. A computer-implemented method, embodied in at least one computer system, for providing auditory feedback to a visually impaired user when defining a visual model, comprising:
    detecting a visual overlap between at least two visual objects in a visual model being created by said user, wherein said detecting said visual overlap between said at least two visual objects includes detecting when a first one of said at least two visual objects is placed by said user such that at least a portion of at least a second one of said at least two visual objects is visually obscured by at least a portion of said first one of said at least two visual objects; and
    responsive to said detecting of said overlap, automatically causing a speaker contained in said computer system to output an audible warning indicating detection of said visual overlap between said at least two visual objects, wherein said causing said audible warning includes creating an invisible object within a user interface containing said two visual objects to cause the auditory warning to be output, wherein said invisible object contains a representation of said auditory warning, wherein said invisible object is created in front of said first one of said at least two visual objects within a logical ordering of all visual objects in said visual model.

2. The method of claim 1, further comprising:
    further responsive to said detecting of said overlap, causing a current focus of said user interface to be automatically set to one of said at least two visual objects.

3. The method of claim 1, wherein said causing said current focus of said user interface to be set to one of said at least two visual objects further comprises setting said current focus of said user interface to said first one of said at least two visual objects.

4. The method of claim 3, said creating said audible warning further comprising:
    modifying said first one of said at least two visual objects to contain a representation of said auditory warning.

5. The method of claim 1, wherein said logical ordering of said visual objects in said visual model is a tab ordering of said visual objects in said visual model enabling said user to traverse said visual objects in said logical order by repeatedly pressing a tab key.

6. The method of claim 5, wherein said representation of said auditory warning comprises text within said invisible object, and wherein said causing said audible warning further comprises causing a screen reader program to read said text within said invisible object.

7. The method of claim 6, further comprising:
    further responsive to said detecting of said overlap, causing a current focus of said user interface to be automatically set to said invisible object.

8. The method of claim 7, further comprising:
    subsequent to said causing said current focus of said user interface to be automatically set to said invisible object, causing said current focus of said face to be automatically set to said first one of said at least two visual objects.

9. The method of claim 8, wherein said representation of said auditory warning comprises text within said first one of said at least two visual objects, and wherein said causing said audible warning further comprises causing a screen reader program to read said text within said first one of said at least two visual objects.

10. The method of claim 9, further comprising:
    detecting that said user has corrected said visual overlap between said at least two visual objects; and
    responsive to said detecting that said user has corrected said visual overlap between said at least two objects, deleting said warning from said first one of said at least two visible objects.

11. The method of claim 8, further comprising:
    detecting that said user has corrected said visual overlap between said at least two visual objects; and
    responsive to said detecting that said user has corrected said visual overlap between said at least two objects, deleting said invisible object.

12. The method of claim 1, further comprising:
    further responsive to said detecting of said overlap, displaying a user interface object enabling said user to accept said overlap.

13. The method of claim 1, further comprising:
    wherein said warning indicates an extent of said overlap.

14. The method of claim 13, wherein said warning indicates said extent of said overlap by volume, wherein a louder warning indicates a larger overlap and a softer warning indicates a smaller overlap.

15. A computer system including at least one processor communicably coupled to a program storage memory, said program storage memory having program code stored thereon which, when executed by said at least one processor causes said computer system to provide auditory feedback to a visually impaired user when defining a visual model, comprising:
    program code for detecting a visual overlap between at least two visual objects in a visual model being created by said user, wherein said detecting said visual overlap between said at least two visual objects includes detecting when a first one of said at least two visual objects is placed by said user such that at least a portion of at least a second one of said at least two visual objects is visually obscured by at least a portion of said first one of said at least two visual objects; and
    program code for, responsive to said detecting of said overlap, automatically causing a speaker contained in said computer system to output an audible warning indicating detection of said visual overlap between said at least two visual objects, wherein said causing said audible warning includes creating an invisible object within a user interface containing said two visual objects to cause the auditory warning to be output, wherein said invisible object contains a representation of said auditory warning, wherein said invisible object is created in front of said first one of said at least two visual objects within a logical ordering of all visual objects in said visual model.

16. A computer program product including a computer readable storage medium, said computer readable storage medium having stored thereon program code for providing auditory feedback to a visually impaired user when defining a visual model, said program code comprising:

program code for detecting a visual overlap between at least two visual objects in a visual model being created by said user, wherein said detecting said visual overlap between said at least two visual objects includes detecting when a first one of said at least two visual objects is placed by said user such that at least a portion of at least a second one of said at least two visual objects is visually obscured by at least a portion of said first one of said at least two visual objects; and program code for, responsive to said detecting of said overlap, automatically causing a speaker to output an audible warning to be output indicating detection of said visual overlap between said at least two visual objects, wherein said causing said audible warning includes creating an invisible object within a user interface containing said two visual objects to cause the auditory warning to be output, wherein said invisible object contains a representation of said auditory warning, wherein said invisible object is created in front of said first one of said at least two visual objects within a logical ordering of all visual objects in said visual model.

* * * * *